Figure 5:
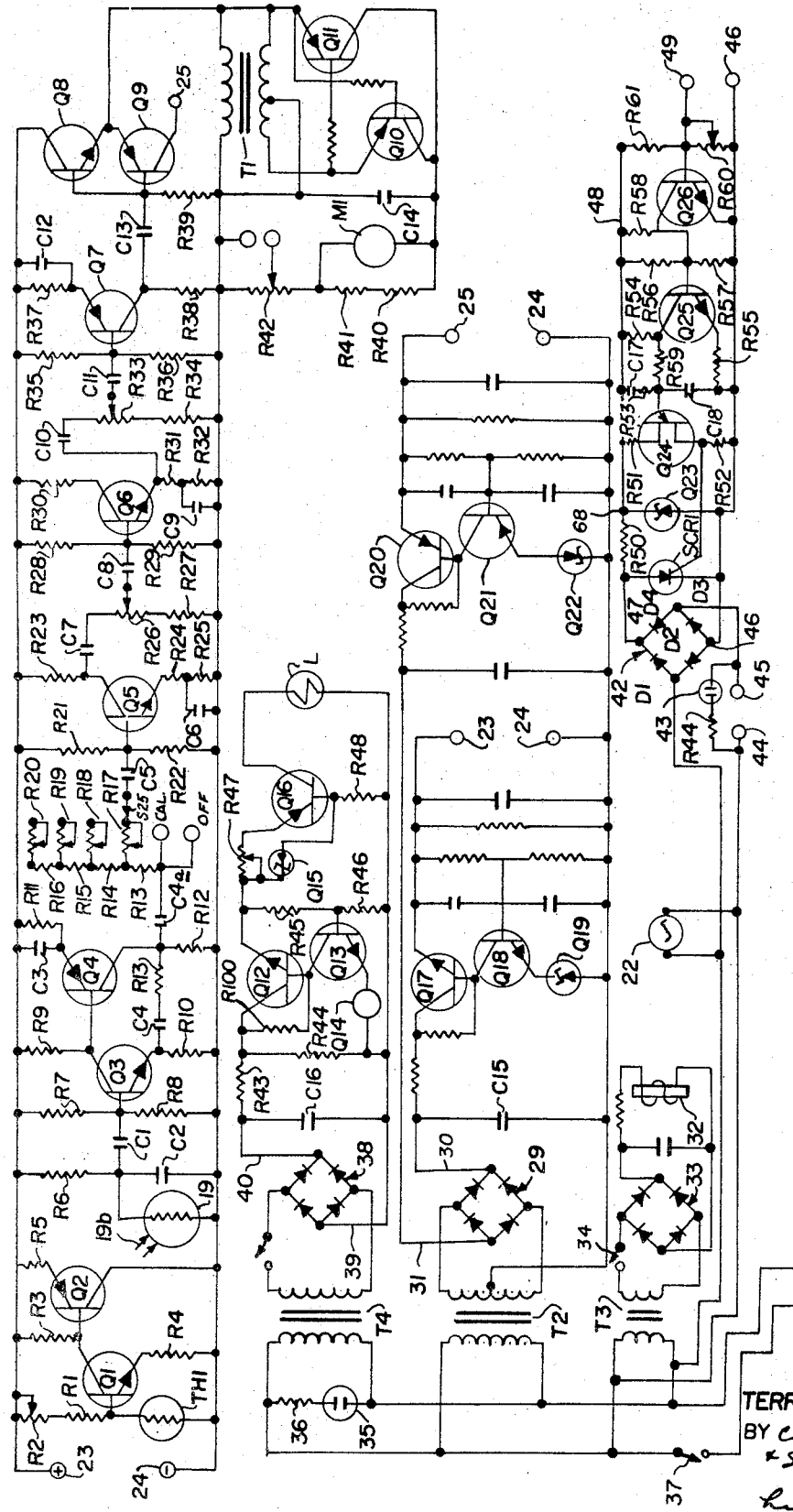

United States Patent

[11] 3,555,243

| [72] | Inventor | Terrance S. Roman<br>Latrobe, Pa. |
|---|---|---|
| [21] | Appl. No. | 581,242 |
| [22] | Filed | Sept. 22, 1966 |
| [45] | Patented | Jan. 12, 1971 |
| [73] | Assignee | Ratio Controls Corporation<br>Addison, Ill.<br>a corporation of Delaware. by mesne assignments |

[54] OPTICAL PYROMETER
8 Claims, 6 Drawing Figs.

| [52] | U.S. Cl. | 219/502 |
|---|---|---|
| [51] | Int. Cl. | H05b 1/02 |
| [50] | Field of Search | 73/355;<br>250/238, 238X, 83.31R, 207(Cursory); 219/502,<br>499; 356/47 |

[56] References Cited
UNITED STATES PATENTS

| 2,438,160 | 3/1948 | Green | 219/502X |
|---|---|---|---|
| 2,640,137 | 5/1953 | Ketchledge | 356/47X |
| 3,045,125 | 7/1962 | Mason | 250/238 |
| 3,195,398 | 7/1965 | Shaw | 250/207X |
| 3,245,509 | 4/1966 | Larson | 250/83.3X |
| 3,435,173 | 3/1969 | Connoy et al. | 219/502 |

OTHER REFERENCES
Kuzminski RCA TN No. 333 Nov. 1959 " Long Time Stable Heated Cell of Cadmium Sulfide" 250-238

*Primary Examiner*—Bernard A. Gilheany
*Assistant Examiner*—F. E. Bell
*Attorney*—Parmelee, Utzler & Welsh

ABSTRACT: A novel, solid state heating circuit is provided to maintain the photosensitive cell. At a predetermined temperature such that the instrument response is essentially independent of ambient temperature.

PATENTED JAN 12 1971
3,555,243
SHEET 1 OF 2
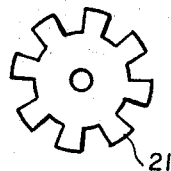
Fig. 2
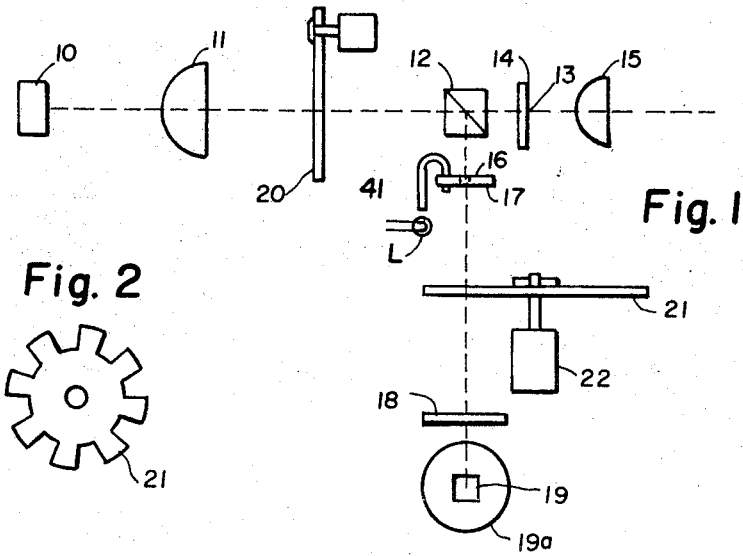
Fig. 1
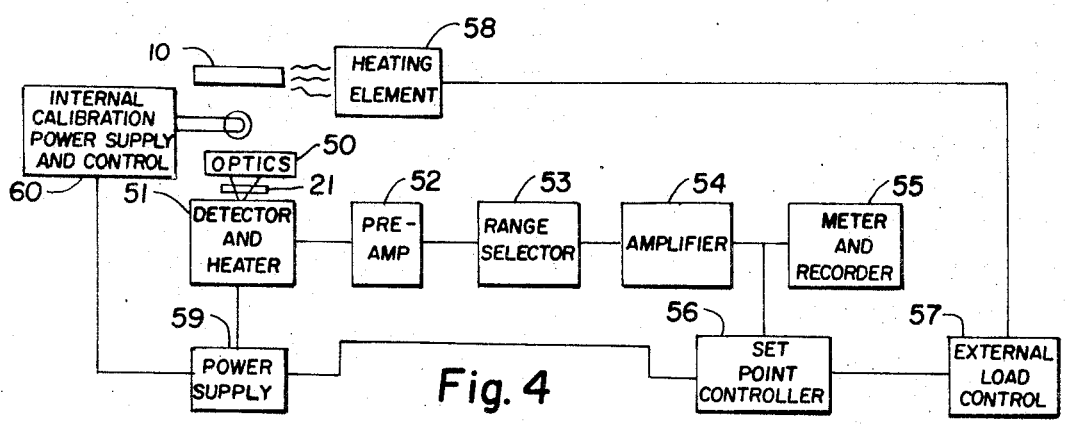
Fig. 4
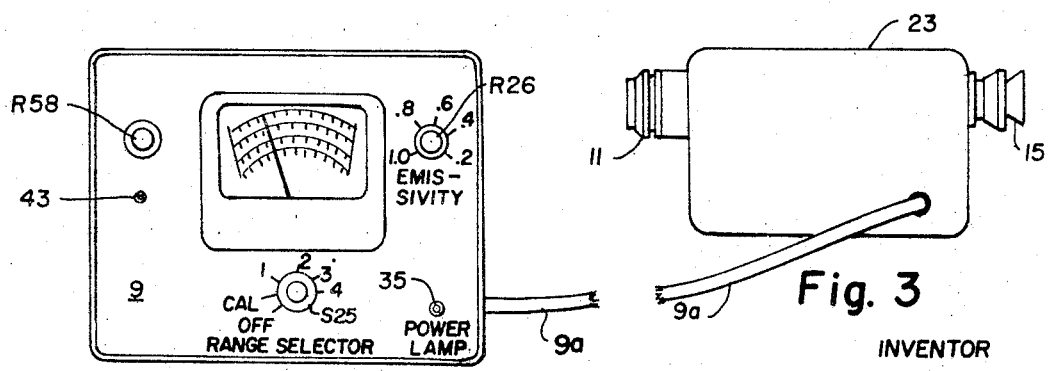
Fig. 6
Fig. 3
INVENTOR
TERRANCE S. ROMAN
BY
Christy, Pomula + Strickland
his ATTORNEY

OPTICAL PYROMETER

This invention relates to optical pyrometers and particularly to monochromatic optical pyrometers with self-contained, automatically actuated, external temperature control circuit and other novel features.

Optical pyrometers are well known as noncontact type temperature measuring devices which direct light waves from a hot body or radiant source upon a photosensitive element to produce temperature indicative electrical signals. The present invention is an improvement in pyrometers of this general class and is specifically illustrated and described herein as a monochromatic optical pyrometer with novel solid state circuitry. More particularly, the invention is described as a pyrometer for measuring radiant energy in the infrared portion of the spectrum. The optical system comprises a suitable filter for passing only selected wavelengths and means for focusing the incoming light rays from an object onto a solid state photosensitive element, such as a lead sulfide cell. Disposed in the light path there is a rotating chopper wheel for alternately interrupting and permitting passage of the light to produce an alternating output from the detector or photosensitive element. A novel, solid state heating circuit is provided to maintain the lead sulfide cell at a predetermined temperature, whereby the instrument's response is substantially independent of ambient temperature and other sources of spurious radiation which introduce errors.

A DC voltage is applied to the lead sulfide (PbS) cell, which is a photosensitive variable resistance, and the impingement of the chopped or pulsed light waves on the cell produces an alternating voltage component across the cell. This AC voltage is amplified in a gain circuit with novel meter scale range selection, emissivity adjustment and calibration means. The amplifier output, which is a temperature indicative signal, may be visually indicated on a meter, recorded on a suitable recording device and also applied to a novel temperature set point controller circuit which generates a control signal voltage capable of being applied to some external load when the temperature indicative signal varies from a predetermined level. The control signal, for example, may be employed to actuate a heating device for the object whose temperature is being measured when the temperature of the object falls below a predetermined level.

The pyrometer of the invention is provided with a shutter means for screening the photosensitive element from external light and a source of internal light of known and regulatable temperature for calibration of the instrument. A novel solid state circuit is provided for controlling the calibration lamp intensity or temperature.

A solid state power supply supplies both B+ and B− voltages for various of the operating components. Separate power supplies are provided for the shutter, internal calibration circuit and chopper motor.

The present invention, therefore, makes possible a compact, lightweight, portable pyrometer with completely solid state components with a built-in set point controller of unique design, which can easily and accurately be calibrated, and which is more reliable, accurate, and flexible than other types of noncontact pyrometers presently available. The provision of a circuit for controlling an external load makes the instrument useful in a temperature control system, and more particularly, a closed loop temperature control system.

An object of the invention is to provide a new and useful pyrometer.

Another object is to provide an improved noncontact pyrometer which is stable and accurate, can be easily and accurately calibrated, and which is capable of producing signals useful in a temperature control system.

These and other objects will be be apparent to those skilled in the art and more fully understood by reference to the following description, wherein FIG. 1 is a more or less schematic illustration of the pyrometer sensing head with the parts in functional relation, FIG. 2 is a plan view of the chopper disc, FIG. 3 is a side elevation of an assembled pyrometer sensing head, FIG. 4 is a block diagram of the pyrometer circuitry, FIG. 5 is a schematic of the entire circuitry, and FIG. 6 is the front view of the pyrometer circuitry chassis.

Referring to the drawings and particularly FIG. 1, there is shown the sensing head components in their functional relationship, the general arrangement of which is known in the art. The specific embodiment of the present invention will be described as a monochromatic pyrometer and more particularly as an infrared pyrometer. The target or object 10 is the thing whose temperature is to be measured and which radiates light waves in the infrared portion of the spectrum. Light enters the instrument through the lens 11 and passes to a beam splitter 12 which splits the incoming rays into two portions, one portion passing through the splitter, through the aperture 13 in reticle disc 14, thence through the lens 15 of the sighting eye piece, the other portion being reflected 90° to pass through aperture 16 of reticle disc 17, through filter 18, thence to the detector or photosensitive element 19. Disposed adjacent the light path between lens 11 and beam splitter 12 there is a solenoid activated shutter 20 which can be electively positioned into and out of the light path for calibration purposes as will be later explained. Disposed in the light path intermediate the beam splitter 12 and photosensitive element 19 there is a chopper wheel or disc 21 rotated by motor 22.

Detector 19 is enclosed in a module 19a containing heater and heater control components later described. The components of FIG. 1 are suitably mounted in a sensing head housing 23 as seen in FIG. 3.

The described instrument is designed to measure temperatures by measuring the photon energy in the infrared portion of the light emitted by a radiant body. For this purpose filter 18 is disposed in the light path in advance of the detector 19 to pass only energy in the infrared portion of the spectrum and block other light frequencies. Filter 18 is a long pass filter such as 1.7 micron cut-on filter. The "cut-on" wavelength refers to the wavelength at which the filter will pass approximately 5 percent of the maximum photon energy available in the infrared band. A heat-absorbing infrared filter which passes about 85 percent of the available photon energy in the band of about 1.7 to 2.6 microns has been found suitable for use with the described embodiment.

The detector 19 is preferably a lead sulfide (PbS) cell capable of providing suitable responses in the temperature range of from about 200° F. to at least 1500° F. While the theoretical temperature range is from zero to infinity, 200° F. is suggested as a lower limit since the lead sulfide cell loses efficiency or temperature resolution below this temperature. Similarly the cell becomes saturated and loses temperature resolution at temperatures significantly above 1500° F. with the illustrated optical system. However, it is possible to extend the upper temperature limit to as much as about 4000° F. if additional suitable heat-absorbing filters are employed or by using a selective beam splitter. In either case the photon energy reaching the detector would be decreased and the instrument should be recalibrated for the lower energy input. In the instant embodiment the beam splitter reflects about 90 percent of the incoming energy to the detector 19, and transmits the remaining 10 percent to the eyepiece lens 15.

Accuracy with instruments of this type requires that the field defined by the reticle aperture 16 be filled with radiation from the target and to insure this the reticle apertures 16 and 13 should be of the same size and spaced the same distance from the focal point, i.e, the same distance from the beam splitter. The ratio of line-of-sight distance from the target to the target diameter is chosen so that light completely fills the circular apertures 13 and 16. The ratio of 80:1 has been found suitable for most pyrometer uses.

The chopper wheel 21 is constructed with a plurality of equisized and equispaced teeth or segments around the wheel with a like plurality of equisized and equispaced open spaces between the teeth. The wheel is disposed such that on rotation thereof the light beam from aperture 16 is alternately completely interrupted and allowed to pass through the spaces between the teeth. The light beam is therefore impinged on the detector 19 in "pulses." With an eight toothed wheel as shown, rotated at 1800 r.p.m. by motor 22, the pulse frequency would be 240 c.p.s. This has been found to be a suitable pulse repetition rate for the combined lead sulfide cell and the later described circuitry. A pulse rate of about 180—300 c.p.s. has also been found satisfactory.

Turning now to FIG. 5, the complete solid state circuitry with power supplies is schematically shown. A 10 volt DC voltage is applied across terminals 23 and 24, 23 being positive and 24 being negative.

The detector heater circuit module 19a (FIG. 1) is comprised of negative temperature coefficient thermistor THI (10K. ohm cold resistance), transistors Q1 and Q2, and various resistances. Q1 is an NPN transistor (2N1302) with base biasing resistance comprised of THI, 270K. ohm resistor R1 and variable (75K. ohm maximum) resistance R2 in series across terminals 23 and 24. The collector of Q1 is connected to terminal 23 through a 10K. ohm resistor R3, and the Q1 emitter is connected to terminal 24 through a 1K. ohm resistor R4. Q1 and Q2 (PNP 3907/2N404) are connected collector-to-base with Q2 collector being grounded and Q2 emitter connected to terminal 24 through a 100K. ohm resistor R5. This heater circuit operates to maintain the detector 19 at a predetermined temperature on the order of 95—125° F. for a lead sulfide cell having a photosensitive area of about 1—2 mm². Q2 forms the heat sink for heating detector 19, THI and the other components within module 19a. Q2 of course is in physical proximity to detector 19 as is THI. The ambient temperature around detector 19 is sensed by TH1 whose resistance varies in accordance with the detector ambient temperature, thus varying the conduction of Q1 and Q2 and controlling the detector ambient temperature. The desired predetermined temperature is set by adjusting the R2 wiper arm which determines the range of base bias voltage applied to Q1 by the voltage divider comprised of TH1, R1 and R2. If the temperature is below the predetermined level, THI will be at a relatively high resistance level whereby a base bias voltage will be applied to Q1 sufficient to drive it into conduction. When Q1 conducts, the base of Q2 is driven more negative thereby driving Q2 into conduction and generating heat, indicated by arrow 19B, which raises the detector and TH1 ambient temperature. As the temperature rises TH1 resistance decreases, lowering the Q1 base bias voltage and eventually cutting off Q1. Cutoff of Q1 drives the base of Q2 more positive, cutting off Q2. Lowering the variable resistance R2 will cause Q2 to conduct for a longer period of time and result in a higher temperature. Conversely, raising the R2 resistance will permit Q2 to conduct for relatively shorter periods resulting in lower temperatures.

Detector 19, which is a variable resistance, photosensitive, lead sulfide cell, forms a voltage divider circuit across terminals 23 and 24 with a 47K. ohm resistor R6. The chopped light beam from the target, incident on the detector, produces across the detector variable resistance a series of negative pulses whose amplitude is indicative of target temperature. Light incident on the detector decreases its resistance, hence the negative going pulses. These pulses are coupled to a preamplifier comprised of Q3 and Q4 through coupling capacitor C1 (84mf.). Capacitor C2 (.054 mf.) is a bypass capacitor for bypassing frequencies substantially higher than 240 c.p.s. to prevent distortion of the detector output. C1 is made large enough to present a low impedance to the low frequency intelligence pulses applied to the base of Q3 (NPN2N708). Resistances R7 (470K. ohm and R8 (100K. ohm) form a voltage divider across terminals 23 and 24 to supply base bias voltage for Q3. Q3 has its collector connected to terminal 23 through R9 (6.9K. ohms) and its emitter connected to terminal 24 through R10 (2.7K. ohms). Q3 and Q4 are connected collector-to-base, and Q4 (PNP 3907/2N404) has its emitter connected to the positive terminal 23 through C3 (25 mf.) and R11 (1K. ohm) in parallel, and its collector connected to the negative terminal 24 through R12 (2.7K. ohms). Q3 and Q4 are also connected emitter-to-collector through a series circuit comprised of C4 (100 mf.) and R13 (1K. ohm).

The amplified output from the preamplifier section is taken across R12 in the collector circuit of Q4 and coupled through capacitor C4a (8 mf.) to a selector switch S25 having various positions as shown in FIG. 6. Switch S25 is movable from OFF position to a CALIBRATE (CAL) positions, to any one of a plurality of meter range selection positions. In the illustrated embodiment four ranges are provided by the voltage divider comprised of resistances R13–14–15–16 and variable resistances R17–18–19–20. The points 1, 2, 3, and 4 for selector switch S25 correspond to the ranges 1, 2, 3 and 4 shown on the chassis 9 in FIG. 6 and to the meter scales 1, 2, 3 and 4 respectively. Preferably the range of resistances is chosen so as to provide overlap between successive meter scales. Variable resistors R17–18–19–20 are provided for adjusting the meter reading during calibration.

From the range selector the signal is coupled to the base of Q5 (NPN 2N1302) through coupling capacitor C5 (25 mf.). Base bias for Q5 is provided by a voltage divider connected across terminal 23 and 24 and comprised of resistors R21 (39K. ohm) and R22 (8K. ohm). Transistors Q5, Q6 (NPN 2N1302), and Q7 (PNP 3907/2N404) together comprise a three-stage amplifier section. The collector of Q5 is connected to terminal 23 through resistor R23 (10K. ohm) and its emitter is connected to terminal 24 through resistors R24 (47K. ohm) and R25 (2K. ohm) with bypass capacitor C6 (25 mf.) in parallel with R25. The output from Q5 is taken from the collector and coupled to the base of Q6 through coupling capacitors C7 (25 mf.) and C8 (25 mf.). The output from Q5 appears across the resistance comprised of variable resistor R26 (10K. ohm maximum) and fixed resistor R27 (240K. ohm) which are connected between one side of capacitor C7 and terminal 24. R26 is a potentiometer which is adjustable to apply a selected portion of the Q5 output to the base of Q6 and is a means for adjusting the gain of the circuit to compensate for the emissivity of the scanned target.

Base bias for Q6 is provided by a voltage divider connected across terminals 23 and 24 and comprised of resistors R28 (39K. ohm) and R29 (47K. ohm). The collector of Q6 is connected to terminal 23 through resistor R30 (10K. ohm) and the emitter of Q6 is connected to terminal 24 through resistors R31 (47K. ohm) and R32 (2K. ohm ) with bypass capacitor C9 (25 mf.) in parallel with R32 Q6 is an emitter-follower, its output being taken from the emitter and coupled to the base of Q7 through coupling capacitors C10 (25 mf.) and C11 (25 mf.). The output from Q6 appears across the resistance comprised of variable resistor R33, (1K. ohm maximum) and fixed to resistor R34 (10K. ohm), which are connected between one side of capacitor C10 and terminal 24. R33 is a potentiometer which is adjustable to apply a selected portion of the Q6 output to the base of Q7 and is a means for adjusting the gain of the circuit. Particularly, R33 provides a fine gain control for calibration of the instrument.

Base bias for Q7 is provided by a voltage divider connected across terminals 23 and 24 and comprised of resistors R35 (20K. ohm) and R36 (39K. ohm). The emitter of Q7 is connected to terminal 23 through resistor R37 (10K. ohm) with variable bypass capacitor C12 (5 mf. maximum) in parallel with R37. C12 provides another means for effecting gain control over the amplifier circuit. The collector of Q7 is connected to terminal 24 through resistor R38 (10K. ohm).

The output of Q7 is taken from its collector and coupled through capacitor C13 (25 mf.) to the bases of Q8 (NPN 2N1302) and Q9 (PNP 3907/2N404) which together comprises a push-pull output amplifier.

The collector of Q8 is connected directly to terminal 23 and the collector Q9 is connected directly to terminal 25 which is at a potential of 10 volts. The emitters of both Q8 and Q9 are connected to terminal 24 through the primary of transformer T1. The bases of both Q8 and Q9 are connected to terminal 24 through resistor R39 (100K. ohm) which prevents crossover distortion between Q8 and Q9 by maintaining the base of the conducting transistor forward biased and the base of the non-conducting transistor biased into cutoff. Thus, during the positive half-cycle of the push-pull amplifier input, Q9 will conduct but the base of Q8 will be biased to cut off and during the negative half-cycle Q8 will conduct while Q9 is biased to cut off.

The alternating output from the push-pull amplifier is coupled to the center tapped secondary of T1 where it is applied to a full wave rectifier circuit comprised of Q10 and Q11 (both PNP 3907/2N404). This rectified wave is impressed across capacitor C14 (25 mf.) and applied to a meter circuit comprised of meter M1 and various resistors. Resistors R40 (1K. ohm) and R41 (10K. ohm) are in series with each other and in parallel with M1. Variable resistor R42 (1K. ohm maximum) is in series with the parallel combination of M1, R40 and R41 and comprises a potentiometer for applying an output voltage to terminals 26 and 27. The output from R42 may be applied to a recorder or the like (not shown). Meter M1 of course presents a visual indication of the target temperature.

Power to the instrument is supplied from a standard 100-—125 volt AC 60 c.p.s. supply across terminals 26 and 27 with chassis ground at 28. B+ and B— voltages are derived from the input power lines by means of transformer T2. The secondary of T2 is center-tapped and is connected to terminal 24, the common terminal. Across the secondary of T2 there is a full-wave rectifier bridge 29. Terminals 30 and 31 are the output terminals of the bridge 29 from which are derived regulated B+ and B— voltages respectively.

The voltage across terminals 24 and 30 is applied to a voltage regulating circuit comprised of transistors Q17 and Q18 (both NPN 2N1302), zener diode Q19 (1N1771) and associated resistors and capacitors connected in a known manner to produce a B+ voltage between terminals 23 and 24. The voltage across terminals 24 and 31 is applied to a similar voltage regulating circuit comprised of transistors Q20 and Q21 (both PNP, 3907/2N404) zener diode Q22 (1N1771) and associated resistances and capacitors to produce a B— voltage across terminals 24 and 25. The power supply will provide + or − 10 volts DC with an input of 95—125 volts AC at 60 c.p.s.

The chopper wheel motor 22 is supplied from the input terminals 26 and 27.

Another transformer T3 supplies power to solenoid 32 for rotating the shutter 20 to screen the pyrometer from external light during calibration of the instrument. Across the secondary of T3 there is a full wave, diode rectifier bridge 33 which supplies DC power to the solenoid when switch 34 is closed.

Neon pilot lamp 35 and dropping resistor 36 are connected in series with the input power line, so that lamp 35 glows and is visible on the chassis 9 (FIG. 6) when switch 37 is closed to indicate that power is on.

Transformer T4 also receives line input power and supplies a calibration lamp circuit. Across the secondary of T4 there is a full wave diode rectifier bridge 38 having output terminals 39 and 40 across which is connected capacitor C16 (500 mf.). In parallel with C16 is a voltage divider comprised of resistors R43 (100K. ohm) and R44 (560K. ohm). The collector of transistor Q12 (NPN 2N 1302) is connected to the positive side of R44. The base of Q12 is connected to the collector of Q13 (NPN 2N 1302) and the emitter of Q13 is connected to the negative side of R44 (terminal 39) through zener diode Q14 (1N1771) whose cathode is connected to terminal 39. A voltage divider comprised of R45 (1K. ohm) and R46 (5K. ohm) is connected across the emitter of Q12 and terminal 39 and the base of Q13 is connected to the positive side of R46. Transistor Q16 (PNP 3907/2N404) has its emitter connected to the emitter of Q12 through a variable resistance R47 (350K. ohm maximum). In parallel with R45 and R46 there is a voltage divider comprised of zener diode Q15 (1N1771), whose cathode is connected to the emitter of Q12, and R48 (100K. ohm). The base of Q16 is connected to terminal 39 through R48, i.e., to the positive side of R48. The collector of Q16 is connected to one side of a calibration lamp L, the other side of which is connected to terminal 39.

The calibration lamp L is a tungsten filament lamp physically located, as seen in FIG. 1, so that its light rays pass through a light pipe 41 which is laterally offset from aperture 16, whereby the light impinges on a portion only of the photosensitive element. This arrangement is preferred where a tungsten lamp is used because the full intensity of the lamp may saturate the photocell. A tungsten lamp, however, is preferred for calibration because of its stability and reliability. The light, of course, passes through the chopper wheel and filter as does light from an external source. Varying R47 varies the lamp intensity and therefore its temperature and the associated solid state calibration lamp circuitry maintains the lamp filament at the selected temperature for calibration of the pyrometer.

Input power line terminals 26 and 27 are also connected to a full-wave diode bridge rectifier 42 through a resistor R49 (22K. ohm) and neon lamp 43 in series in line 26. In parallel with resistor R44 and lamp 43 there are a pair of terminals 44 and 45 connectable to some external load (not shown). Bridge 42 is comprised of diodes D1, D2, D3 and D4. The bridge 42 output is produced across terminals 46 and 47 across which is connected a silicon controlled rectifier SCR (C6118) with its cathode connected to 46 and its anode to 47. In parallel with the SCR there is a resistor R50 (10K. ohm) and zener diode Q23 (1N1771) whose anode is connected to line 46. Terminal 48 is the junction between R50 and the cathode of Q23. Across lines 48 and 46, in parallel with Q23, there is a unijunction transistor Q24 (2N1671A) whose base-two region is connected to line 48 through resistor R51 (680K. ohm) and whose base-one region is connected to line 46 through resistor R52 (330K. ohm) and to the gate electrode of the SCR. The emitter of Q24 is connected to line 48 through resistor R53 (10K. ohm) and capacitor C17 (0.5 mf.) in series and to line 46 through capacitor C18 (0.25 mf.).

Supplying an input signal for the unijunction transistor Q24 there is a two stage amplifier comprised of transistors Q25 (NPN 2N1304) and Q26 (NPN 2N1304). The collector of Q25 is connected to line 48 through resistor R54 (10K. ohm), to the emitter of Q24 through R59 (10K. ohm) and its base to line 46 through resistor R55 (1K. ohm). Base bias for Q25 is provided by a voltage divider comprised of resistors R56 (220K. ohm) and R57 (10K. ohm) connected across lines 46 and 48. Q26 collector is connected to line 48 through resistor R58 (10K. ohm) and to the base of Q25. The emitter of Q26 is connected to line 46. Base bias for Q26 is provided by a voltage divider connected across lines 46 and 48 comprising resistors R61 (270K. ohm) and variable resistance R60 (75K. ohm) maximum. The input signal to Q26 is applied to its base across R60 by terminals 46 and 49. This input voltage may be AC or DC and may be applied from across R40 or R42, in the pyrometer output circuit.

The just described circuit is useful in controlling the application of power to an external load, connected across terminals 44 and 45, in accordance with the signal across the circuit input terminals 46 and 49. By varying the value of R60 a preselected input voltage can regulate the application of power to an external load. In the described embodiment, for example, the output voltage of the pyrometer, indicative of the temperature of a scanned target, can control the application of power to an external load. Where, for example, the target temperature is controllable by the external load, the circuit may be adjusted such that when the sensed temperature (pyrometer output signal) falls below a predetermined minimum level, power will be applied to the external load to raise the target temperature.

The operation of the load control circuit will now be described. Assume that on-off switch 37 is closed, a light signal is being received and R60 has been preset to permit a circuit response to some predetermined value of the temperature indicative input signal applied to terminals 46 and 49. Assume also that the input signal is initially above the minimum level at which the circuit is set to respond and that an external load is connected across terminals 44 and 45.

With these conditions amplifier Q26 and Q25 are biased to cut off, unijunction Q24 is not triggered and no pulse can be formed to gate the SCR. With SCR off there is no path for current through the external load. Neon lamp 43 will be off to visually indicate that no power is being applied to the external load. Lamp 43 is mounted to be visible on chassis 9 in FIG. 6.

Now when the input voltage across terminals 46 and 49 falls below the predetermined value set by R60, indicating a decreased target temperature, Q26 is biased into conduction. When this occurs Q25 will also conduct and capacitor C18 will charge to the firing potential of unijunction Q24 producing a gate pulse to fire the SCR. Gate pulses will be generated continuously so long as the input voltage across terminals 46 and 49 remains below the predetermined level. With the SCR conducting there is an effective short across terminals 46 and 47 of bridge 42. With the SCR gated and a positive potential on input terminal 27 there is a complete current path from terminal 26, through the external load, diode D3, the SCR, and diode D1 back to terminal 27. When the input voltage across terminals 26 and 27 is negative, i.e., terminal 27 negative, the SCR would tend to become nonconductive. However, the potential across terminals 46 and 48 maintains a positive potential on the anode of the SCR by reason of the charge on capacitors C17 and C18, whereby the SCR conduction is sustained through the negative portion of the input cycle and current continues to flow through the external load. The path for current is then from terminal 27, through D2, the SCR, D4, the external load and back to input terminal 26.

The external load may be used to control the temperature of the target by controlling some heating means, e.g. as indicated at 58 in FIG. 4. When target temperature is raised again to a level whereby the input across terminals 46 and 49 is above the predetermined level, the amplifiers Q25 and Q26 become nonconductive, unijunction Q24 is extinguished and the SCR gate pulses are no longer produced. The SCR will then cease conducting a short time interval after the input voltage on terminal 27 swings negative. The SCR may continue conducting for a short interval because of the charge on capacitors C17 and C18.

The predetermined voltage at which the load control circuit will respond, is set by adjusting the resistor R60, which preferably is capable of adjusting the voltage on the base of Q26 within a range of about 5 to 95 percent of the input voltage across terminals 46 and 49.

To insure proper circuit operation and to simplify the circuit ground connections, all transformers should be in phase.

FIG. 4 is a block diagram of the overall arrangement of a pyrometer according to the invention with an external load forming a closed loop temperature control system.

The heated object 10 radiates light waves which pass through suitable optics 50 of the type previously described. The optics 50 may include a suitable filter such as the infrared band pass filter 18. The filtered light waves impinge on the detector or photosensitive element and heater 51, which may be a lead sulfide cell 19 with a heat shield 19a, to generate an electrical signal indicative of the target temperature. Chopper wheel 21 may be employed to pulse the light waves whereby a pulsed output is provided by the detector. This temperature indicative signal, having an AC component, is amplified in a preamplifier 52 and the resulting signal coupled to an amplifier 54 through a range selector 53. The range selector allows the proper meter scale to be selected for accurate readings. The signal from amplifier 54 is sent to a meter and/or recorder 55 for visual indication of target temperature. The same signal from amplifier 54 is sent to the set-point controller 56 which produces an output control signal when the temperature signal from amplifier 54 falls below a predetermined set-point. The signal from controller 56 may be used to actuate an external load control device 57 such as a relay or the like to in turn actuate a heating load device such as the heating element 58 which may be separately supplied with power from a source not shown. The heating element responds by heating target 10 to raise its temperature back to a predetermined temperature. A suitable power supply 59 is provided and there may be an internal calibration means 60 if desired.

FIG. 6 illustrates the manner in which the pyrometer is desirably constructed. The sensing head 23 contains the essential elements illustrated in FIG. 1 so that it may be light in weight and easily portable. Chassis 9 contains all the remaining circuit elements and controls and meters necessary for the operation of the pyrometer. The sensing head and chassis 9 are connected by a suitable cable 9a.

The described invention therefore provides a unique solid state, noncontact type, temperature measuring device which can readily be incorporated in a closed loop system for controlling the temperature of a hot body or similar system wherein a temperature indicative signal provides a control signal for application to a load external to the pyrometer.

While one embodiment of the invention has been described, it will be apparent to those skilled in the art that variations and modifications in the construction and arrangement of the parts are possible within the scope and spirit of the invention.

I claim:

1. An optical pyrometer, comprising;
    a. a photosensitive element;
    b. means for directing a beam of light from a target into the photosensitive element;
    c. means in circuit with the photosensitive element for generating an output signal indicative of the temperature of the target;
    d. means in circuit with the last named means and responsive to the output signal for generating another signal when the output signal varies from a predetermined set point; and
    e. means for continuously maintaining the photosensitive element ambient temperature at a substantially constant predetermined temperature; comprising:
        i. a heat sensitive variable resistance for detecting the temperature, and
        ii. means responsive to the change in resistance for changing the ambient temperature in accordance with the change in resistance.

2. The combination as defined in claim 1, wherein the means for maintaining the photosensitive element ambient temperature at a substantially constant predetermined temperature, comprises:
    a. first and second transistors,
    b. a thermistor for sensing the ambient temperature,
    c. a variable resistance different from the thermistor, the transistors, thermistor and variable resistance being so interconnected that changes in thermistor resistance result in one of the transistors being biased into and out of a heat-generating conductive state; and
    d. means enclosing the photosensitive element, transistor, and thermistor in a confined space separate from substantially all other pyrometer components.

3. An optical pyrometer as defined in claim 1, including a rotating chopper wheel disposed in the path of incoming light in advance of the photosensitive element for intermittently interrupting the light beam whereby light is impinged on the photosensitive element with a pulsed effect.

4. An optical pyrometer as defined in claim 3, wherein a filter is disposed in the path of incoming light in advance of the photosensitive element, which filter passes a selected portion only of the light spectrum.

5. An optical pyrometer as defined in claim 4, wherein the filter passes light in the infrared portion of the spectrum.

6. An optical pyrometer as defined in claim 1, wherein the photosensitive element is a lead sulfide cell.

7. An optical pyrometer as defined in claim 1, including means for the internal calibration of the pyrometer, comprising:
    a. a source of light of known temperature;

b. means for screening the pyrometer from other sources of light;
c. means for directing light from the source onto the photosensitive element; and
d. means for selectively varying the intensity and therefore the known temperature of the light source.

8. In combination with an optical pyrometer capable of producing an electrical signal indicative of the temperature of an object, the improvement comprising:
   a. a power supply;
   b. an output load in series with the power supply; and
   c. circuit switching means for connecting and disconnecting the power supply and the output load in accordance with the level of the temperature indicative electrical signal, the switching means comprising:
      i. a diode rectifier bridge having four terminals two of the terminals being connected to opposite poles of the power supply,
      ii. a semiconductor device having anode, cathode and gate electrodes, connected across the other two bridge terminals in a manner such that it is normally nonconductive but capable of being triggered into conduction by a gate pulse, conduction of the semiconductor serving to complete a series circuit with the power supply and output load,
      iii. amplifier means connected to receive the temperature indicative electrical signal from the pyrometer to produce an amplified output signal, and
      iv. a unijunction transistor connected to receive the amplifier output signal and to produce a gate pulse for triggering the semiconductor device.